No. 753,056. PATENTED FEB. 23, 1904.
H. E. EWART.
CURRYCOMB.
APPLICATION FILED SEPT. 28, 1903.
NO MODEL.
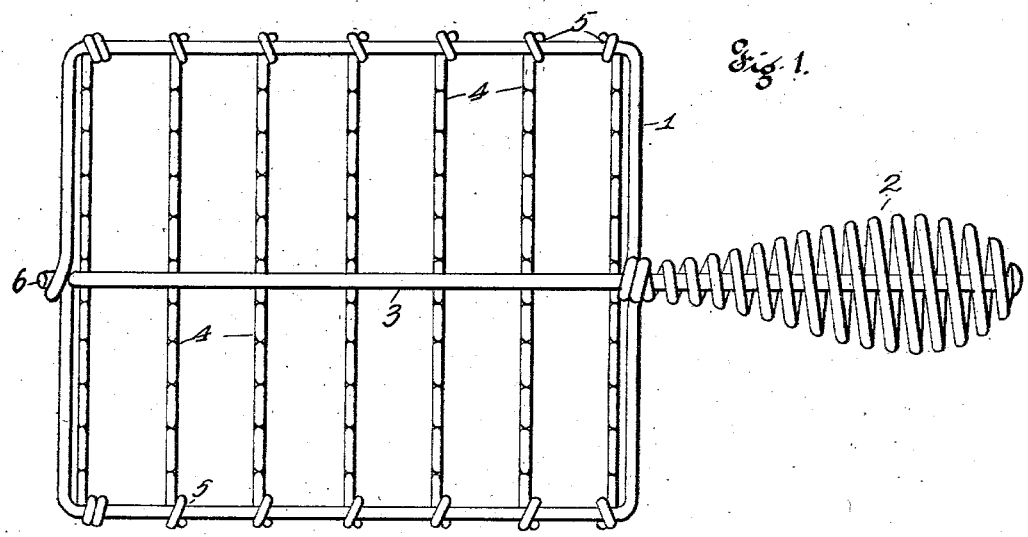
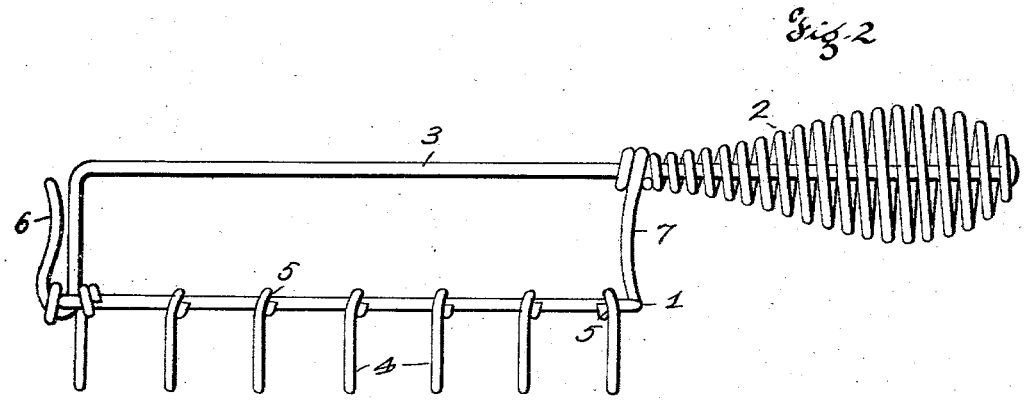
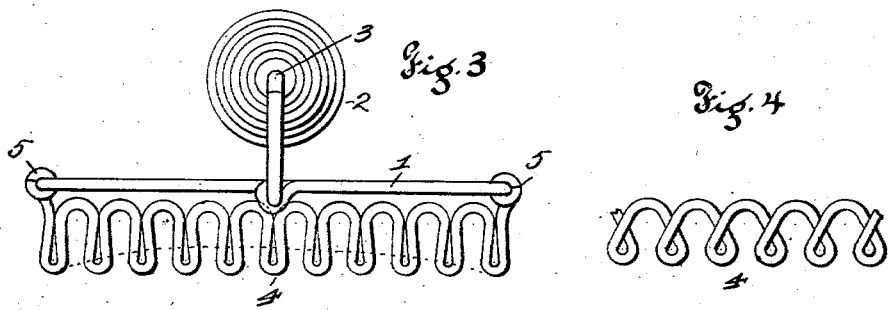
Witnesses
Alfred A. Hicks
M. A. Brion
Inventor
Hugo E. Ewart
by Higdon & Longan & Hopkins Atty.

No. 753,056.

Patented February 23, 1904.

UNITED STATES PATENT OFFICE.

HUGO E. EWART, OF ST. LOUIS, MISSOURI.

CURRYCOMB.

SPECIFICATION forming part of Letters Patent No. 753,056, dated February 23, 1904.

Application filed September 28, 1903. Serial No. 174,977. (No model.)

*To all whom it may concern:*

Be it known that I, HUGO E. EWART, a citizen of the United States, residing at St. Louis, State of Missouri, have invented certain new and useful Improvements in Currycombs, of which the following is a specification containing a full, clear, and exact description, reference being had to the accompanying drawings, forming a part hereof.

My invention relates to improvements in currycombs; and it consists in the novel construction hereinafter described and claimed.

The object of my invention is to provide an improved currycomb composed entirely of wire, which shall be cheap and simple in construction, yet on account of its flexible rows of wire teeth very efficient in operation without harmfully irritating the skin of the animal.

In the drawings, Figure 1 is a plan view of a currycomb embodying my invention. Fig. 2 is a side elevation. Fig. 3 is an end elevation. Fig. 4 is a detail view of a modified form of a flexible row of wire teeth.

I preferably provide a rectangular frame 1, composed of stout wire, and a handle 2, composed of coiled wire, preferably formed integral with said frame and elevated a distance above and projecting at one end or side of said frame. Said handle is preferably connected to said frame by means a wire loop 3, which extends across the top of the currycomb and has its ends connected to the opposite sides of said frame, so as to form a handhold into which the operator's hand may be inserted when he desires to dispense with the use of the handle 2. The loop 3 acts as an efficient handhold by means of which the operator may manipulate the currycomb without the use of the handle 2, and in some cases said handle may therefore be dispensed with and the currycomb made without any handle except that provided by the said loop.

4 indicates flexible rows of wire teeth, preferably constructed of a single piece of wire bent to form a multiplicity of U-shaped loops projecting in opposite directions and of two different sizes, the smaller loops all projecting from the lower edge of the row and separated a considerable distance from each other in order to form teeth with comparatively abrupt ends, while all of the larger U-shaped loops project from the opposite edge of the row. There is a plurality of rows extending across the frame 1 in a direction at right angles to the handle 2 and loop 3, and each row of teeth is separated a distance from the other rows and has its ends 5 coiled around the frame 1 and preferably secured by some form of solder, although the ends of said rows may be secured in any other known manner.

In Fig. 4 I have shown a modified form of a flexible row of wire teeth in which the upper U-shaped loops are preserved; but the lower loops are displaced by a smaller loop, the arms of which cross each other and are connected to the arms of the two next adjacent upper loops.

The outer end of the loop 3 after engaging beneath the frame 1 is bent upwardly and curved outwardly, as shown, as is also the opposite end 7 of said loop, for the purpose of forming finger-holds at the end of said loop.

The operation is as follows: The operator grasps the handle 2 and may use the currycomb as an ordinary one. In other cases the operator may insert his hand in the spaces between the loop 3 and the body of the comb and grasp the opposite edges of the comb with his fingers and thumb and in that way make very effective use of the device. In other words, the operator may grasp the curved end handles 6 and 7, which form the ends of the loop 3, and in that way make use of the comb.

It will be readily apparent that the flexible rows of wire teeth will give when pressure is applied to them, substantially as indicated by dotted line in Fig. 3, and in that manner will not irritate the animal's skin as will a common currycomb which has unyielding rows of teeth.

What I claim is—

1. The improved currycomb, comprising a suitable frame, and flexible rows of wire teeth, formed of a single piece of wire bent intermediate of its ends to form oppositely-projecting U-shaped loops, said rows secured at their ends to said frame, the lower ones of said loops being smaller than the upper loops of said rows, substantially as specified.

2. The improved currycomb, comprising a suitable frame, flexible rows of wire teeth, formed of a single piece of wire bent intermediate of its ends to form oppositely-projecting U-shaped loops, and said rows secured at their ends to said frame, and a wire loop applied to the back of said frame so as to form a space between said loop and said frame for the insertion of the operator's hand, the opposite ends of said loop being curved to form finger-holds, substantially as specified.

3. The improved currycomb, comprising a suitable frame, flexible rows of wire teeth, formed of a single piece of wire bent intermediate of its ends to form oppositely-projecting U-shaped loops, and said rows secured at their ends to said frame, a wire loop applied to the back of said frame so as to form a space between said loop and said frame for the insertion of the operator's hand, the opposite ends of said loop being curved to form finger-holds, and a handle projecting at one end of said back loop, substantially as specified.

In testimony whereof I have signed my name to this specification in presence of two subscribing witnesses.

HUGO E. EWART.

Witnesses:
ALFRED A. EICKS,
JOHN C. HIGDON.